United States Patent
Hashizawa et al.

(10) Patent No.: US 10,847,776 B2
(45) Date of Patent: Nov. 24, 2020

(54) CONDUCTIVE MODULE AND BATTERY PACK

(71) Applicant: Yazaki Corporation, Tokyo (JP)

(72) Inventors: Shigemi Hashizawa, Shizuoka (JP); Hidehito Ishida, Shizuoka (JP); Mitsuhiro Matsumoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 131 days.

(21) Appl. No.: 15/904,081

(22) Filed: Feb. 23, 2018

(65) Prior Publication Data
US 2018/0248167 A1   Aug. 30, 2018

(30) Foreign Application Priority Data
Feb. 28, 2017 (JP) .................. 2017-037394

(51) Int. Cl.
| | |
|---|---|
| *H01M 2/20* | (2006.01) |
| *H01M 10/42* | (2006.01) |
| *H01M 2/04* | (2006.01) |
| *H01M 2/30* | (2006.01) |
| *H01M 10/48* | (2006.01) |
| *H01M 10/6554* | (2014.01) |
| *H01M 2/10* | (2006.01) |

(52) U.S. Cl.
CPC .......... *H01M 2/206* (2013.01); *H01M 2/043* (2013.01); *H01M 2/30* (2013.01); *H01M 10/425* (2013.01); *H01M 10/482* (2013.01); *H01M 2/1077* (2013.01); *H01M 10/6554* (2015.04); *H01M 2220/20* (2013.01)

(58) Field of Classification Search
CPC ............ H01M 10/482; H01M 10/425; H01M 2010/4271; H01M 2/206; H01M 2/30
See application file for complete search history.

(56) References Cited

U.S. PATENT DOCUMENTS

| | | | | |
|---|---|---|---|---|
| 2014/0212695 A1* | 7/2014 | Lane | ..................... | H01M 2/204 429/7 |
| 2014/0370343 A1* | 12/2014 | Nomoto | ............ | H01M 10/4207 429/90 |
| 2018/0130989 A1* | 5/2018 | Saito | ..................... | H01M 2/206 |

FOREIGN PATENT DOCUMENTS

JP          5648602 B2      1/2015

OTHER PUBLICATIONS

Webpage: https://omnexus.specialchem.com/polymer-properties/properties/stiffness printed Sep. 16, 2019. (Year: 2019).*

* cited by examiner

*Primary Examiner* — Maria Laios
(74) *Attorney, Agent, or Firm* — Kenealy Vaidya LLP

(57) ABSTRACT

A conductive module applied to a battery pack includes a connection terminal electrically coupled to an electrode terminal, and a flexible substrate that includes a flexible base film having insulating property, a conductive layer in which a first circuit pattern is configured by a first conductor that electrically couples the connection terminal to a monitoring device, and a reinforcing protective film covering the conductive layer. The reinforcing protective film includes a first exposed portion that exposes a first connection end portion of the first conductor from the reinforcing protective film, and has relatively higher rigidity than rigidity of the flexible base film.

10 Claims, 7 Drawing Sheets

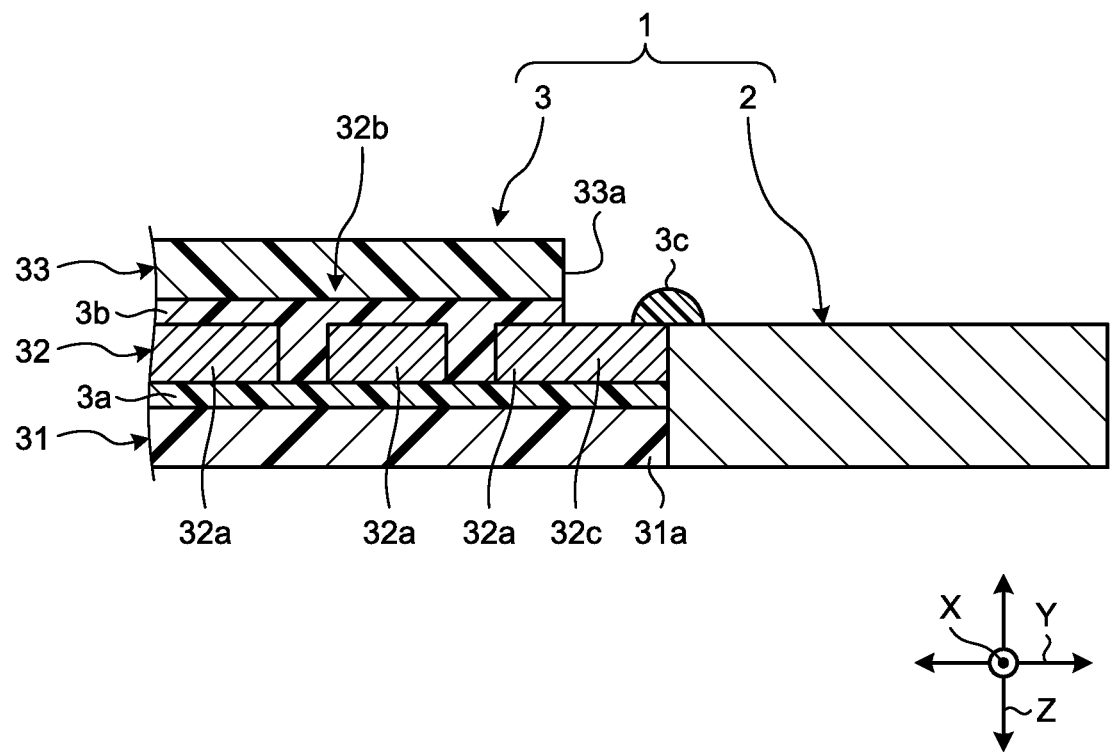
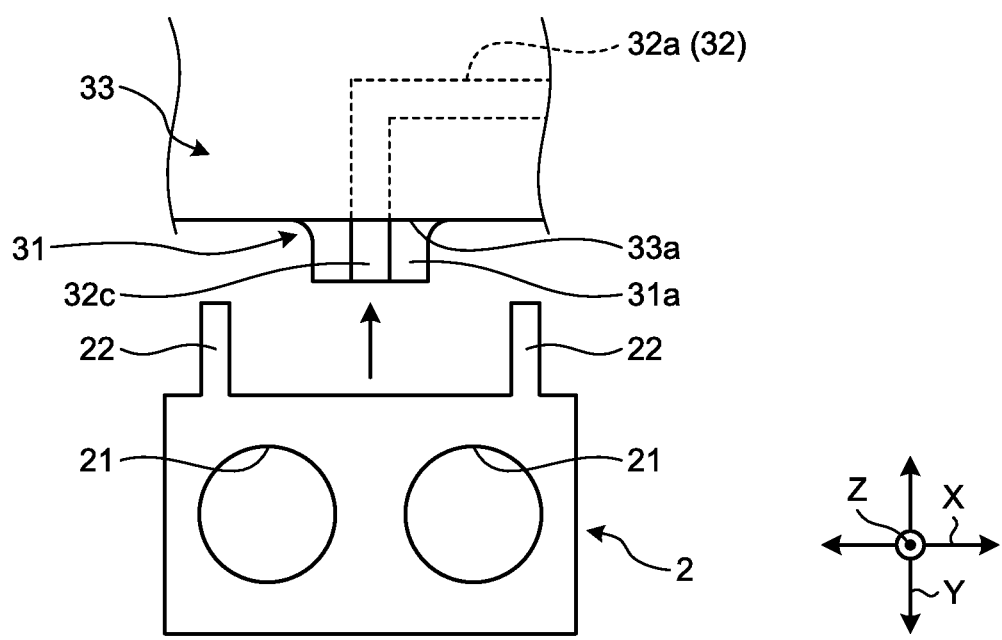

CONDUCTIVE MODULE AND BATTERY PACK

CROSS-REFERENCE TO RELATED APPLICATION(S)

The present application claims priority to and incorporates by reference the entire contents of Japanese Patent Application No. 2017-037394 filed in Japan on Feb. 28, 2017.

BACKGROUND OF THE INVENTION

1. Field of the Invention

The present invention relates to a conductive module and a battery pack.

2. Description of the Related Art

As a conventional conductive module that is applied to a vehicular battery pack, Japanese Patent No. 5648602 discloses a battery wiring module that is mounted on an electric cell group in which a plurality of electric cells having electrode terminals of a positive electrode and a negative electrode are arranged and that couples the electrode terminals to each other, for example. The battery wiring module includes a resin protector, a flexible printed circuit board, and a plurality of reinforcing plates. The resin protector retains a plurality of bus bars that couple the electrode terminals to each other. The flexible printed circuit board is retained by the resin protector and has electronic components that are mounted thereon in order to constitute an electric circuit to process information on an electric cell taken in via the bus bars. The reinforcing plates are lined on a back surface of an area of the flexible printed circuit board on which the electronic components are mounted.

However, in the battery wiring module described in Japanese Patent No. 5648602 described above, there is room for further improvement in assembling workability, for example.

SUMMARY OF THE INVENTION

The present invention has been made in view of the above-mentioned circumstances, and an object of the invention is to provide a conductive module and a battery pack that can improve the workability in assembling.

In order to achieve the above mentioned object, a conductive module according to one aspect of the present invention includes a connection terminal that is electrically coupled to at least one of two electrode terminals that each of a plurality of arrayed battery cells has, and a flexible substrate that includes a sheet-shaped flexible base film that has insulating property, a conductive layer that is stacked on the flexible base film and in that a first circuit pattern is configured by a first conductor that electrically couples the connection terminal to a monitoring device monitoring a state of the battery cell, and a sheet-shaped reinforcing protective film that has insulating property, is stacked on an opposite side of the flexible base film side of the conductive layer, and covers the conductive layer, wherein the reinforcing protective film includes a first exposed portion that exposes from the reinforcing protective film a first connection end portion that is a connection end portion to the connection terminal in the first conductor, and has relatively higher rigidity than rigidity of the flexible base film.

According to another aspect of the present invention, in the conductive module, the flexible substrate may include, on both sides of the first connection end portion in an array direction of the battery cells, cutout portions that penetrate through the flexible base film, the conductive layer, and the reinforcing protective film in a layer direction and extend to one end of a direction intersecting with the layer direction and the array direction.

According to still another aspect of the present invention, in the conductive module, the reinforcing protective film may include, in a direction intersecting with a layer direction of the flexible base film, the conductive layer, and the reinforcing protective film, a bent portion that is recessed to an opposite side of the reinforcing protective film side in the layer direction at a portion located between the first conductors constituting the first circuit pattern.

According to still another aspect of the present invention, in the conductive module, the conductive layer may include a second circuit pattern configured by a second conductor electrically coupling an electronic component to be mounted on the flexible substrate to the monitoring device, and the reinforcing protective film includes a second exposed portion that exposes from the reinforcing protective film a second connection end portion that is a connection end portion to the electronic component in the second conductor.

According to still another aspect of the present invention, in the conductive module, a plurality of the connection terminals may be provided in an array direction of the battery cells, and the flexible substrate includes the first conductor provided for each of the connection terminals and includes a plurality of the first connection end portions and a plurality of the first exposed portions provided in the array direction at an end of a direction intersecting with a layer direction of the flexible base film, the conductive layer, and the reinforcing protective film, and with the array direction.

A battery pack according to still another aspect of the present invention includes a plurality of arrayed battery cells, and a conductive module that electrically couples the battery cells to a monitoring device monitoring a state of the battery cells, wherein the conductive module includes a connection terminal that is electrically coupled to at least one of two electrode terminals that each of the battery cells has, and a flexible substrate that includes a sheet-shaped flexible base film that has insulating property, a conductive layer that is stacked on the flexible base film and in that a first circuit pattern is configured by a first conductor that electrically couples the connection terminal to the monitoring device, and a sheet-shaped reinforcing protective film that has insulating property, is stacked on an opposite side of the flexible base film side of the conductive layer, and covers the conductive layer, and the reinforcing protective film includes a first exposed portion that exposes from the reinforcing protective film a first connection end portion that is a connection end portion to the connection terminal in the first conductor, and has relatively higher rigidity than rigidity of the flexible base film.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a partial sectional view schematically illustrating a configuration of the conductive module in the first embodiment;

FIG. 4 is a partial exploded plan view schematically illustrating a configuration of the conductive module in the first embodiment;

DETAILED DESCRIPTION OF THE PREFERRED EMBODIMENTS

The following describes in detail exemplary embodiments according to the present invention with reference to the accompanying drawings. The invention, however, is not intended to be limited by the embodiments. The constituent elements in the following embodiments include those that are substitutable and easily implemented by a person skilled in the art or that are substantially the same. In the following description, of a first direction, a second direction, and a third direction which intersect with one another, the first direction is referred to as an "array direction X", the second direction is referred to as a "width direction Y", and the third direction is referred to as a "layer direction Z". The array direction X as the first direction, the width direction Y as the second direction, and the layer direction Z as the third direction are orthogonal to one another. The directions used in the following description are directions in a state in which various units are assembled with one another, unless otherwise specifically noted.

First Embodiment

Figure 1:
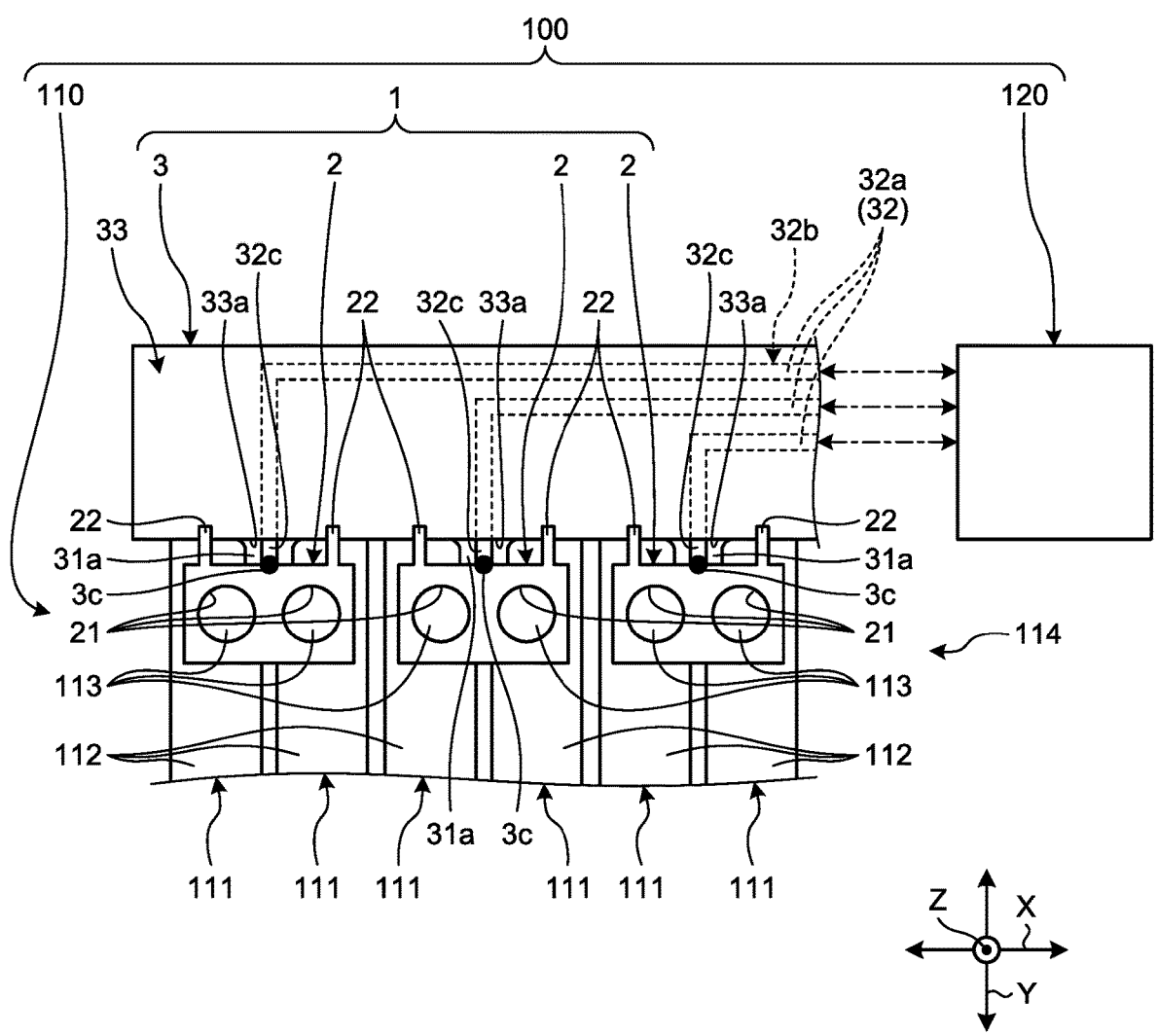
FIG. 1 is a partial plan view schematically illustrating a configuration of a battery pack and a conductive module according to a first embodiment.

A conductive module 1 according to a first embodiment illustrated in FIG. 1 is applied to a battery pack 100 installed on a vehicle. The battery pack 100 is installed on a vehicle (an electric vehicle, a hybrid vehicle, or the like) that includes a rotary machine as a drive source and is provided to supply electricity to the rotary machine, for example. The battery pack 100 includes a battery module 110, a monitoring device 120, and the conductive modules 1. The battery module 110 is configured by of a plurality of battery cells 111 arrayed in the array direction X. The monitoring device 120 is an arithmetic unit constituting a battery monitoring unit that monitors a state (voltage, current, temperature, or the like) of each battery cell 111. The conductive module 1 electrically couples each battery cell 111 constituting the battery module 110 to the monitoring device 120. The monitoring device 120 monitors the state of each battery cell 111 based on information (such as voltage information, current information, and temperature information) indicating the state of the battery cell 111 obtained via the conductive module 1 and uses it for various control such as charge-discharge control. In such a configuration, the conductive module 1 of the first embodiment, by using a flexible substrate 3 that has a certain layer structure for the connection of the battery cells 111 and the monitoring device 120, ensures reduction in size and height, and flexibility of wiring, and achieves improvement in assembling workability. The following describes in detail the configuration of the conductive module 1 with reference to the various drawings.

Figure 2:
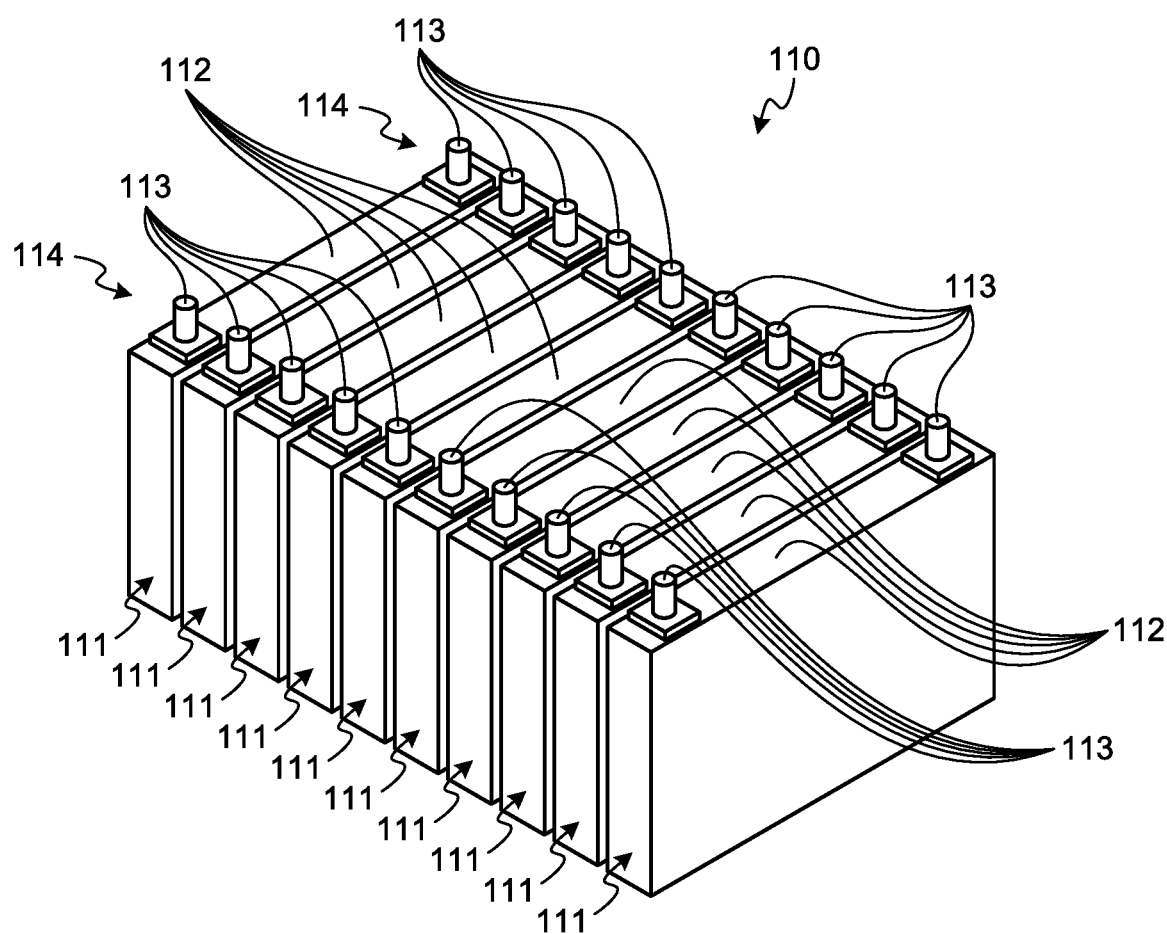
FIG. 2 is a perspective view schematically illustrating a configuration of a battery module in the first embodiment.

First, with reference to FIGS. 1 and 2, each battery cell 111 that is an object of connection of the conductive module 1 will be described. Each battery cell 111 includes a cell body 112 and two electrode terminals 113. The cell body 112 is a main portion constituting the battery cell 111. The cell body 112 is a substantially rectangular parallelepiped plate, and various components are accommodated inside. The two electrode terminals 113 are each installed on any place of the cell body 112 in a state of being exposed outside. One of the two electrode terminals 113 is a positive electrode and the other is a negative electrode. The electrode terminal 113 may be a plate-shaped terminal provided on an outer wall surface of the cell body 112, or may be an electrode pole having a pillar shape projecting from the outer wall surface of the cell body 112, for example. Here, the electrode terminal 113 will be described as an electrode pole that has a substantially columnar shape. In the battery cell 111, when the cell body 112 has a plurality of outer wall surfaces, the electrode terminals 113 each may be arranged on a single outer wall surface, or the outer wall surfaces on which the electrode terminals 113 are arranged may be divided for each electrode terminal 113. In the battery module 110, the battery cells 111 are continuously arrayed in a state that one of the electrode terminals 113 of each battery cell 111 is lined up and the other of the electrode terminals 113 is also lined up. Thus, in the battery module 110, electrode terminal groups 114 each including the electrode terminals 113 arranged in a line are provided at two places. In the battery cell 111, each cell body 112 is a substantially rectangular parallelepiped plate, and on one of the six outer wall surfaces, the positive and negative electrode terminals 113 are provided. Thus, the battery module 110 as a whole has a substantially rectangular parallelepiped shape by the battery cells 111 arrayed in the array direction X, and as an assembly including the battery cells 111, has six wall surfaces thereon. In the battery module 110, each electrode terminal group 114 is provided on one of the six wall surfaces of the assembly.

The conductive module 1 of the first embodiment is coupled to at least one of the respective electrode terminal groups 114 with respect to the thus configured battery module 110. The conductive modules 1, in a total of two, are respectively provided on the electrode terminal groups 114 in two places. Because the two conductive modules 1 are substantially the same configuration mutually, in the following description, the two conductive modules 1 are described in common unless otherwise noted.

The conductive module 1, as illustrated in FIG. 1, includes connection terminals 2 and a flexible substrate 3.

The connection terminal 2 is electrically coupled to at least one of the two electrode terminals 113 that the battery cell 111 has. That is, the connection terminal 2 sets at least one of the arrayed battery cells 111 as the object of connection, and is electrically coupled to one of the two electrode terminals 113 of the battery cell 111 that is the object of connection. The connection terminal 2 is made of a metal material having conductivity. The connection terminal 2 may be directly or indirectly connected with the electrode terminal 113. When coupled to the electrode terminal 113 directly (that is, physically) and electrically, the connection terminal 2 may be welded (laser welding or the like) or fastened to the electrode terminal 113, for example. Meanwhile, when coupled to the electrode terminal 113 indirectly, the connection terminal 2 may be welded (laser welding or the like) or fastened to an intervening member (for example, a terminal portion of a fusible element such as a fuse or the like) that is electrically coupled to the electrode terminal 113, for example.

The connection terminal 2 of the first embodiment constitutes an electrode-connection bus bar that couples, directly and electrically, respective first sides of the two electrode terminals 113 to each other that the respective battery cells 111 adjacent in the array direction X have. That is, the conductive module 1 of the first embodiment is a module using the electrode-connection bus bar, and may be referred to as what is called a bus bar module or the like. The connection terminal 2 constituting the electrode-connection bus bar mutually and electrically couples the electrode terminals 113 of the adjacent battery cells 111 to each other according to a connection method of the battery cells 111 desired in the battery module 110. When coupling a plurality of battery cells 111 in series in the battery module 110, the connection terminal 2 couples together the electrode terminal 113 which constitutes the positive electrode in one of the adjacent battery cells 111 and the electrode terminal 113 which constitutes the negative electrode in the other of the battery cells 111. In this case, in the battery module 110, in the respective electrode terminal groups 114, the electrode terminals 113 of the positive electrode and the negative electrode are arranged alternately. When coupling a plurality of battery cells 111 in parallel in the battery module 110, the connection terminal 2 couples together the electrode terminals 113 which constitutes the positive electrodes in the adjacent battery cells 111 or the electrode terminals 113 which constitutes the negative electrodes. In this case, in the battery module 110, in the respective electrode terminal groups 114, the electrode terminals of the same pole are juxtaposed.

The connection terminal 2 is a substantially rectangular plate the layer direction Z of which is a plate thickness direction, the array direction X is a long-side direction, and the width direction Y is a short-side direction. The connection terminal 2 has two through-holes 21 in each of which the electrode terminal 113 is inserted. The two through-holes 21 are provided in juxtaposition spaced apart in the array direction X. Each of the through-holes 21 has such a size and shape that a single electrode terminal 113 can be inserted in the layer direction Z. The connection terminal 2 is electrically coupled to each of the electrode terminals 113, when a single electrode terminal 113 is inserted into each of the through-holes 21 and a nut or the like is screwed onto the electrode terminal 113. In this case, in the battery module 110, there are two electrode terminals 113 not coupled by the connection terminal 2, and one of those is what is called a total positive electrode and the other is what is called a total negative electrode. The connection terminal 2 further has two fixing pieces 22 which are fixed to the flexible substrate 3, which will be described later. The two fixing pieces 22 are provided in juxtaposition spaced apart in the array direction X on one of the long sides (that is, one side of the two sides in the array direction X) of each connection terminal 2. Each of the fixing pieces 22 projects to one side in the width direction Y from a portion of the substantially rectangular plate of the connection terminal 2. The connection terminal 2 is swaged and fixed to the flexible substrate 3 via the fixing pieces 22, for example. However, the embodiment is not limited to this form, and the connection terminal may be fixed to the flexible substrate 3 in various forms. The connection terminals 2 are provided in juxtaposition in the array direction X of the battery cells 111 with respect to the flexible substrate 3.

The flexible substrate 3, as illustrated in FIGS. 1 and 3, electrically couples the respective connection terminals 2 to the monitoring device 120. The flexible substrate 3 is what is called a flexible printed circuit (FPC). The flexible substrate 3 includes a flexible base film 31, a conductive layer 32, and a reinforcing protective film 33. In the flexible substrate 3, the flexible base film 31, the conductive layer 32, and the reinforcing protective film 33 are stacked in the foregoing order from one side toward the other side in the layer direction Z so as to constitute a layer. The flexible substrate 3 includes the layers of the flexible base film 31, the conductive layer 32, and the reinforcing protective film 33, with adhesives 3a, 3b, and others interposed thereamong, and the layers being mutually bonded by the adhesives 3a, 3b, and others. The connection terminal 2 as a whole is a substantially rectangular plate (belt-like shape) the layer direction Z of which is the plate thickness direction, the array direction X is the long-side direction, and the width direction Y is the short-side direction.

The flexible base film 31 is a layer serving as a base (basis) of the layer structure of the flexible substrate 3. The flexible base film 31 has insulating property. The flexible base film 31 has a sheet-shaped form having relatively high flexibility. The flexible base film 31 has relatively higher flexibility than that of at least the reinforcing protective film 33. The flexible base film 31 is a thin film the layer direction Z of which is the plate thickness direction. The flexible base film 31 is made of resin material having insulating property such as polyimide, for example.

The conductive layer 32 is a layer in which a first circuit pattern 32b is configured by first conductors 32a. The conductive layer 32 is stacked on the surface of one side in the layer direction Z of the flexible base film 31 with the adhesives 3a and others interposed therebetween. The first conductors 32a are made of a metal material having conductivity. The first conductors 32a constitute the first circuit pattern 32b that electrically couples the connection terminals 2 to the monitoring device 120. The first conductors 32a constitute the first circuit pattern 32b by printing metal material such as copper foil on the flexible base film 31 and removing an unnecessary conductive portion by etching or the like, for example. The first conductors 32a constitute the substantially L-shaped first circuit pattern 32b with portions extending in the width direction Y and portions extending in the array direction X, for example. In the first conductor 32a, one end portion of the portion extending in the width direction Y constitutes a first connection end portion 32c. The first connection end portion 32c is an end portion of the first conductor 32a to which the connection terminal 2 is electrically coupled, that is, a connection end portion of the first conductor 32a coupled with the connection terminal 2, and is an end portion exposed from the reinforcing protective film 33, which will be described later. The first conductor 32a is electrically coupled to the monitoring device 120 at an end portion of the portion extending in the array direction X. The first conductor 32a may be directly coupled to the monitoring device 120, or may be indirectly coupled via a connector or the like. The first conductor 32a is provided for each of the connection terminals 2, that is, the number of first conductors 32a provided is the same as the number of connection terminals 2. The first conductor 32a constitutes a voltage detection line to detect the voltage of a region (voltage of the battery cell 111) that is connected via the connection terminal 2, for example.

The reinforcing protective film 33 is a layer that protects the conductive layer 32. The reinforcing protective film 33 has insulating property. The reinforcing protective film 33 is a sheet. The reinforcing protective film 33 is a thin film the layer direction Z of which is the plate thickness direction. The reinforcing protective film 33 is stacked on the surface of the opposite side to the flexible base film 31 side of the conductive layer 32 with the adhesives 3*b* and others interposed therebetween, and covers the conductive layer 32. The reinforcing protective film 33 covers substantially the entire surface of the conductive layer 32, and has a first exposed portion 33*a* that exposes at least a part of the first connection end portion 32*c* from the reinforcing protective film 33. The first exposed portion 33*a* is a portion not covering the conductive layer 32 with the reinforcing protective film 33 in the layer on which the reinforcing protective film 33 is provided. A plurality of first exposed portions 33*a*, and a plurality of first connection end portions 32*c* that are to be exposed from the first exposed portions 33*a*, are provided in juxtaposition in the array direction X at the end of the width direction Y of the flexible substrate 3. That is, the first exposed portions 33*a* and the first connection end portions 32*c* are provided in juxtaposition along the array direction X at the side in the array direction X of the flexible substrate 3.

In more detail, the flexible base film 31 of the first embodiment, as illustrated in FIGS. 1, 3, and 4, has projecting end portions 31*a* projecting along one side of the width direction Y at the side in the array direction X. A plurality of projecting end portions 31*a* are provided in juxtaposition spaced apart in the array direction X. In the conductive layer 32, the first connection end portion 32*c* of the respective first conductors 32*a* is located on each of the projecting end portions 31*a*. In the reinforcing protective film 33, the first exposed portion 33*a* is provided on each of the projecting end portions 31*a* and each first connection end portion 32*c* is exposed from the reinforcing protective film 33. Each of the above-described connection terminals 2 is fixed to the flexible substrate 3 via the fixing pieces 22 in such a positional relation that the fixing piece 22 side faces the projecting end portion 31*a*. Each of the connection terminals 2 is electrically coupled via solder 3*c* and the like to the first connection end portion 32*c* exposed from the respective first exposed portions 33*a*.

The reinforcing protective film 33 of the first embodiment is made of material having relatively higher rigidity than that of the flexible base film 31. The reinforcing protective film 33 is made of resin material having insulating property such as polypropylene, for example.

The conductive module 1 thus configured is fitted to the battery module 110 such that each electrode terminal 113 which constitutes the electrode terminal groups 114 of the battery module 110 is inserted into the through-hole 21 of the respective connection terminals 2. Then, in the conductive module 1, as each electrode terminal 113 is screwed with the nut or the like, each connection terminal 2 is fastened and electrically coupled to the respective electrode terminals 113.

In the above-described conductive module 1 and the battery pack 100, the connection terminals 2, which are electrically coupled to the electrode terminals 113 of the battery cells 111, and the monitoring device 120 can be electrically coupled via the first conductors 32*a* of the conductive layer 32 of the flexible substrate 3. In the conductive module 1, the use of the flexible substrate 3 for the connection of the connection terminals 2 and the monitoring device 120 makes it possible to achieve reduction in the size and height of the entire device, and to flexibly handle an increase or a decrease in the number of circuits and the change in wiring route in response to the increase or the decrease in the number of battery cells 111 and the like. In this case, in the conductive module 1, the flexible substrate 3 is configured by stacking the flexible base film 31, the conductive layer 32, and the reinforcing protective film 33. In the conductive module 1, the reinforcing protective film 33 is configured to have the first exposed portion 33*a* and to have relatively higher rigidity than that of the flexible base film 31. With this configuration, the rigidity of the reinforcing protective film 33 enables the conductive module 1 to retain the shape as a whole even when the flexible substrate 3 having the flexibility is used for the connection of the connection terminals 2 and the monitoring device 120. In addition, the conductive module 1 can electrically couple the first conductor 32*a* to the connection terminal 2 at the first connection end portion 32*c* exposed from the first exposed portion 33*a* of the reinforcing protective film 33. As a result, in the conductive module 1 and the battery pack 100, because the conductive module 1 can be fitted to the battery cells 111 in a state of retaining the overall shape, the workability in assembling can be improved.

Furthermore, in the conductive module 1 and the battery pack 100, unlike the case in which reinforcing plates are separately provided at places of the flexible substrate 3 where rigidity is needed for example, because the reinforcing protective film 33 is provided so as to cover the entire conductive layer 32, the rigidity of substantially the entire flexible substrate 3 can be increased in a lump. As a result, in the conductive module 1 and the battery pack 100, because the staff-hours required for manufacturing the conductive module 1 can be reduced, the manufacturing cost can be reduced.

In the conductive module 1 and the battery pack 100, it does not necessarily require to provide a casing or the like to accommodate the conductive module 1 and the like, separately, because the flexible substrate 3 can stand in a self-standing manner and can retain the shape thereof. In terms of this point also, the conductive module 1 and the battery pack 100 can further achieve reduction in size and height or reduce the manufacturing cost. The conductive module 1 and the battery pack 100 are not intended to hinder the provision of a case or the like to accommodate the conductive module 1.

In more detail, in the above-described conductive module 1 and the battery pack 100, in the flexible substrate 3, the first conductor 32*a* is provided for each of the connection terminals 2, and the first connection end portions 32*c* and the first exposed portions 33*a* are provided in the array direction X at the end of the width direction Y. With this configuration, the conductive module 1 and the battery pack 100 can, as in the foregoing, improve the workability in assembling when fitting the conductive module 1 to the battery cells 111.

Second Embodiment

A conductive module and a battery pack according to a second embodiment are different from those of the first embodiment in that a flexible substrate includes cutout portions. In the following description, constituent elements the same as those in the above-described embodiment are denoted by common reference signs, and redundant explanations of the configuration, operation, and effect in common are omitted as much as possible (the same applies hereinafter).

Figure 5:
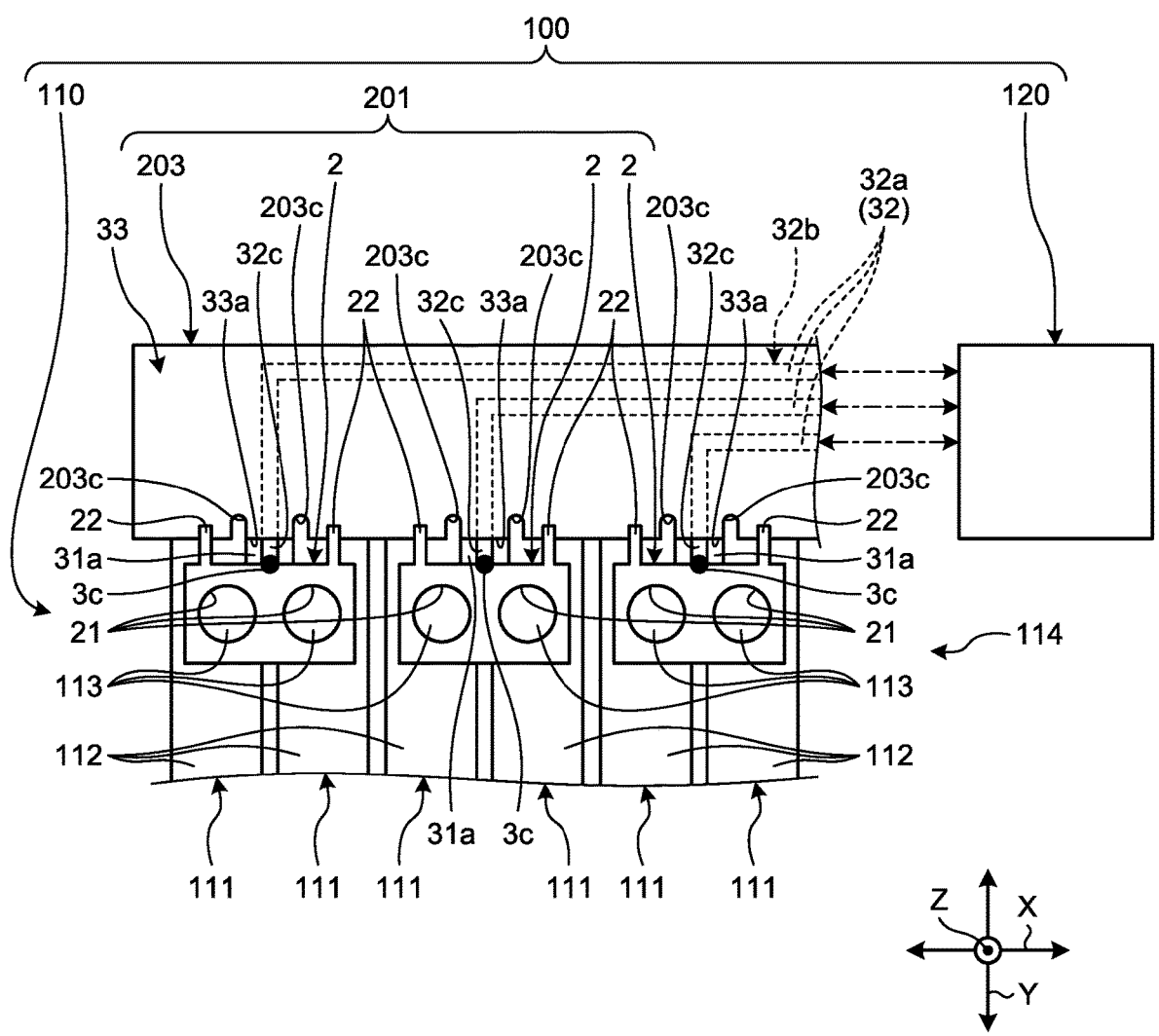
FIG. 5 is a partial plan view schematically illustrating a configuration of a battery pack and a conductive module according to a second embodiment.

The battery pack 100 in the second embodiment, as illustrated in FIG. 5, is different from that of the above-described first embodiment in that a conductive module 201 is included in place of the conductive module 1, and other configurations are substantially the same as those of the first embodiment. The conductive module 201 is different from the above-described conductive module 1 in that a flexible substrate 203 is included in place of the flexible substrate 3, and other configurations are substantially the same as those of the conductive module 1.

The flexible substrate 203 of the second embodiment is different from the above-described flexible substrate 3 in that the flexible substrate 203 includes cutout portions 203c, and other configurations are substantially the same as those of the flexible substrate 3. One each of the cutout portions 203c is formed on both sides in the array direction X of each first connection end portion 32c. Each cutout portion 203c penetrates through the flexible base film 31, the conductive layer 32, and the reinforcing protective film 33 in the layer direction Z. Each cutout portion 203c extends in the width direction Y to one end of the width direction Y, that is, to the end of the side on which the connection terminals 2 are provided.

In the above-described conductive module 201 and the battery pack 100, because the conductive module 201 can be fitted to the battery cells 111 in a state of retaining the overall shape, the workability in assembling can be improved.

In the above-described conductive module 201 and the battery pack 100, the flexible substrate 203 includes the cutout portions 203c on both sides of the first connection end portion 32c. With this configuration, the cutout portions 203c cause the conductive module 201 and the battery pack 100 to have flexibility. That is, the conductive module 201 and the battery pack 100 can, by the cutout portions 203c, cause the connection terminal 2 and the first connection end portion 32c to follow the expansion and contraction of an inter-terminal pitch (intervals of the electrode terminals 113) associated with the tolerance and the thermal expansion of the battery cells 111 and can absorb the expansion and contraction of the inter-terminal pitch. As a result, in the conductive module 201 and the battery pack 100, the conductive module 201 can be fitted to the battery cells 111 further properly.

Third Embodiment

A conductive module and a battery pack according to a third embodiment are different from those of the first and the second embodiments in that a reinforcing protective film includes bent portions.

Figure 6:
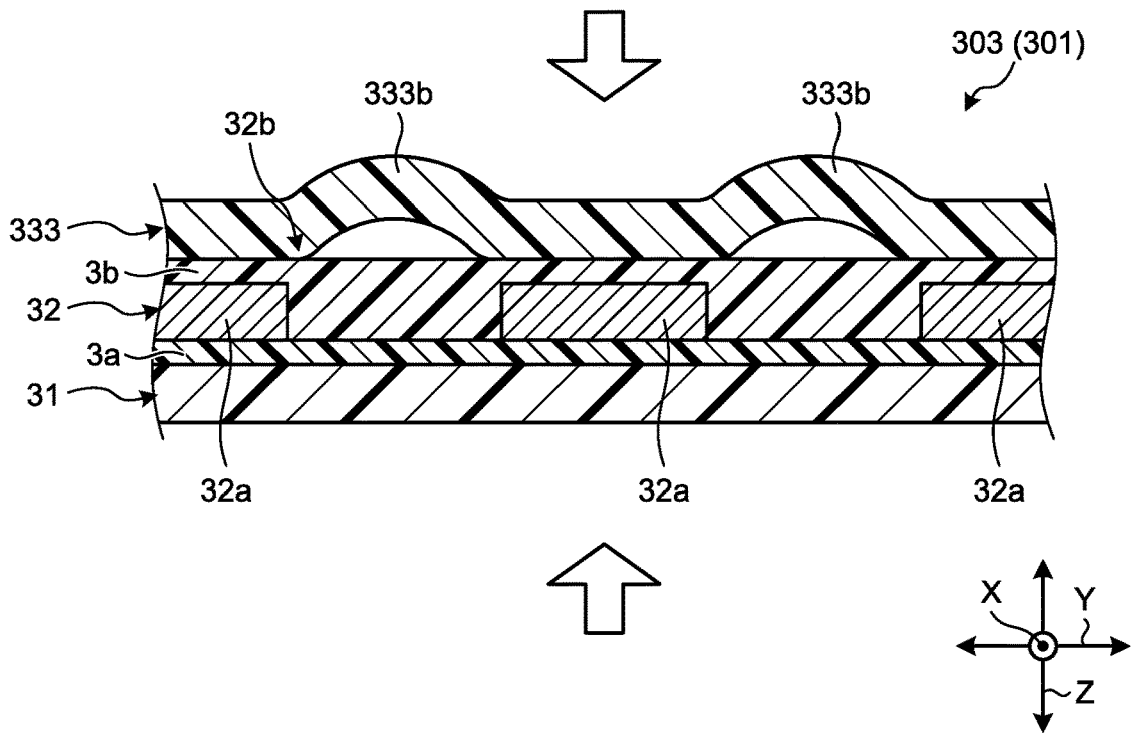
FIG. 6 is a partial sectional view schematically illustrating a configuration of a conductive module according to a third embodiment.
Figure 7:
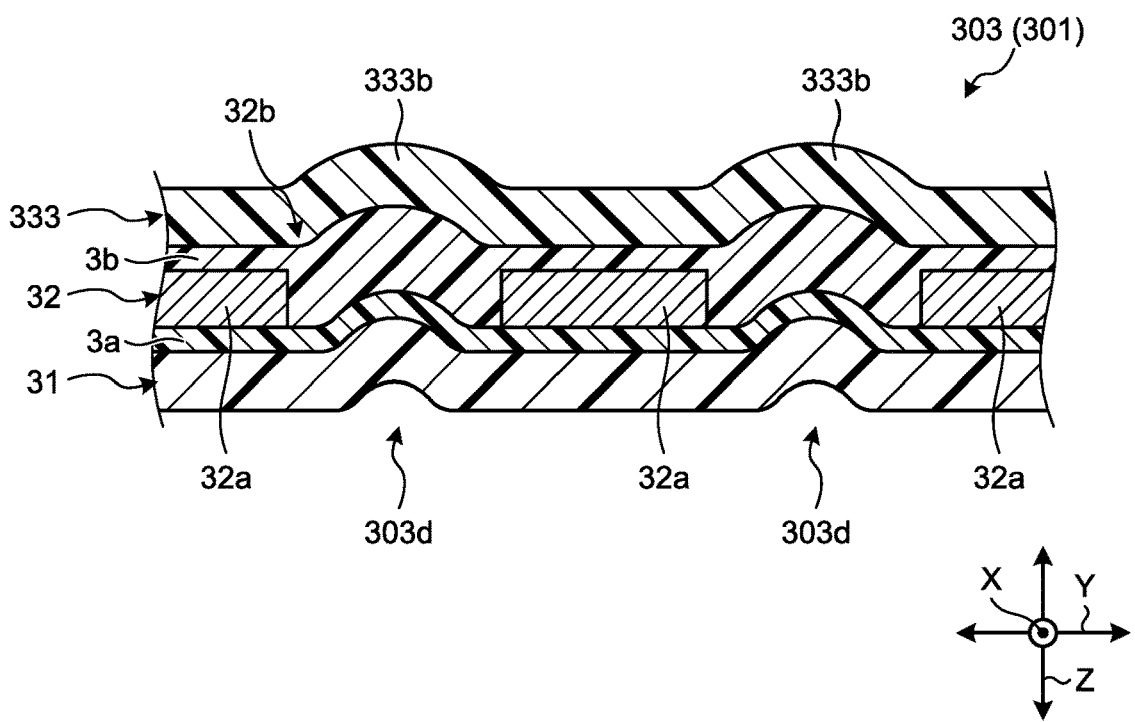
FIG. 7 is a partial sectional view schematically illustrating the configuration of the conductive module in the third embodiment.

The battery pack 100 in the third embodiment, as illustrated in FIGS. 6 and 7, is different from that of the above-described first embodiment in that a conductive module 301 is included therein in place of the conductive module 1, and other configurations are substantially the same as those of the first embodiment. The conductive module 301 is different from the above-described conductive module 1 in that a flexible substrate 303 is included in place of the flexible substrate 3, and other configurations are substantially the same as those of the conductive module 1. The flexible substrate 303 is different from the above-described conductive module 1 in that a reinforcing protective film 333 is included therein in place of the reinforcing protective film 33, and other configurations are substantially the same as those of the conductive module 1.

The reinforcing protective film 333 of the third embodiment is different from the above-described reinforcing protective film 33 in that bent portions 333b are included therein, and other configurations are substantially the same as those of the reinforcing protective film 33. The bent portions 333b are, in the reinforcing protective film 333, formed at portions located between the first conductors 32a which constitute the first circuit pattern 32b in the array direction X and the width direction Y intersecting with the layer direction Z. Each bent portion 333b is, in the reinforcing protective film 333, formed as a recessed portion recessed to the opposite side of the flexible base film 31 side in the layer direction Z. In more detail, each bent portion 333b is formed such that the outer surface on the opposite side of the flexible base film 31 side of the reinforcing protective film 333 projects to the opposite side of the flexible base film 31 side, and such that the inner surface on the flexible base film 31 side of the reinforcing protective film 333 is recessed to the opposite side of the flexible base film 31 side.

In the flexible substrate 303 of the third embodiment, when stacking and bonding the reinforcing protective film 333 to the flexible base film 31 and the conductive layer 32 with the adhesives 3b and others interposed thereamong, the entire flexible substrate 303 is pressed in the layer direction Z (see FIG. 6). At this time, in the flexible substrate 303, because the flexible base film 31 has relatively lower rigidity and relatively higher flexibility than those of the reinforcing protective film 33, the respective layers are mutually bonded together while deforming in accordance with the shape of the respective bent portions 333b of the reinforcing protective film 333, and maintain the shape thereof. Accordingly, the flexible substrate 303 includes variable portions 303d that are curved in accordance with the shape of the bent portions 333b at the portions where the bent portions 333b are formed in the reinforcing protective film 333.

In the above-described conductive module 301 and the battery pack 100, because the conductive module 301 can be fitted to the battery cells 111 in a state of retaining the overall shape, the workability in assembling can be improved.

In the above-described conductive module 301 and the battery pack 100, the reinforcing protective film 333 has the bent portions 333b at the portions located between the first conductors 32a constituting the first circuit pattern 32b. With this configuration, the variable portions 303d can be formed in the flexible substrate 303 by the bent portions 333b, and thus the conductive module 301 and the battery pack 100 can have flexibility. That is, the conductive module 301 and the battery pack 100 can, with the bent portions 333b, and the variable portions 303d included in accordance with the shape of the bent portions 333b, cause the connection terminal 2 and the first connection end portion 32c to follow the expansion and contraction of an inter-terminal pitch associated with the tolerance and the thermal expansion of the battery cells 111 to absorb the expansion and contraction of the inter-terminal pitch. As a result, in the conductive module 301 and the battery pack 100, the conductive module 301 can be fitted to the battery cells 111 further properly.

Fourth Embodiment

A conductive module and a battery pack according to a fourth embodiment are different from those of the first, the second, and the third embodiments in that second conductors and a second exposed portion are provided.

Figure 8:
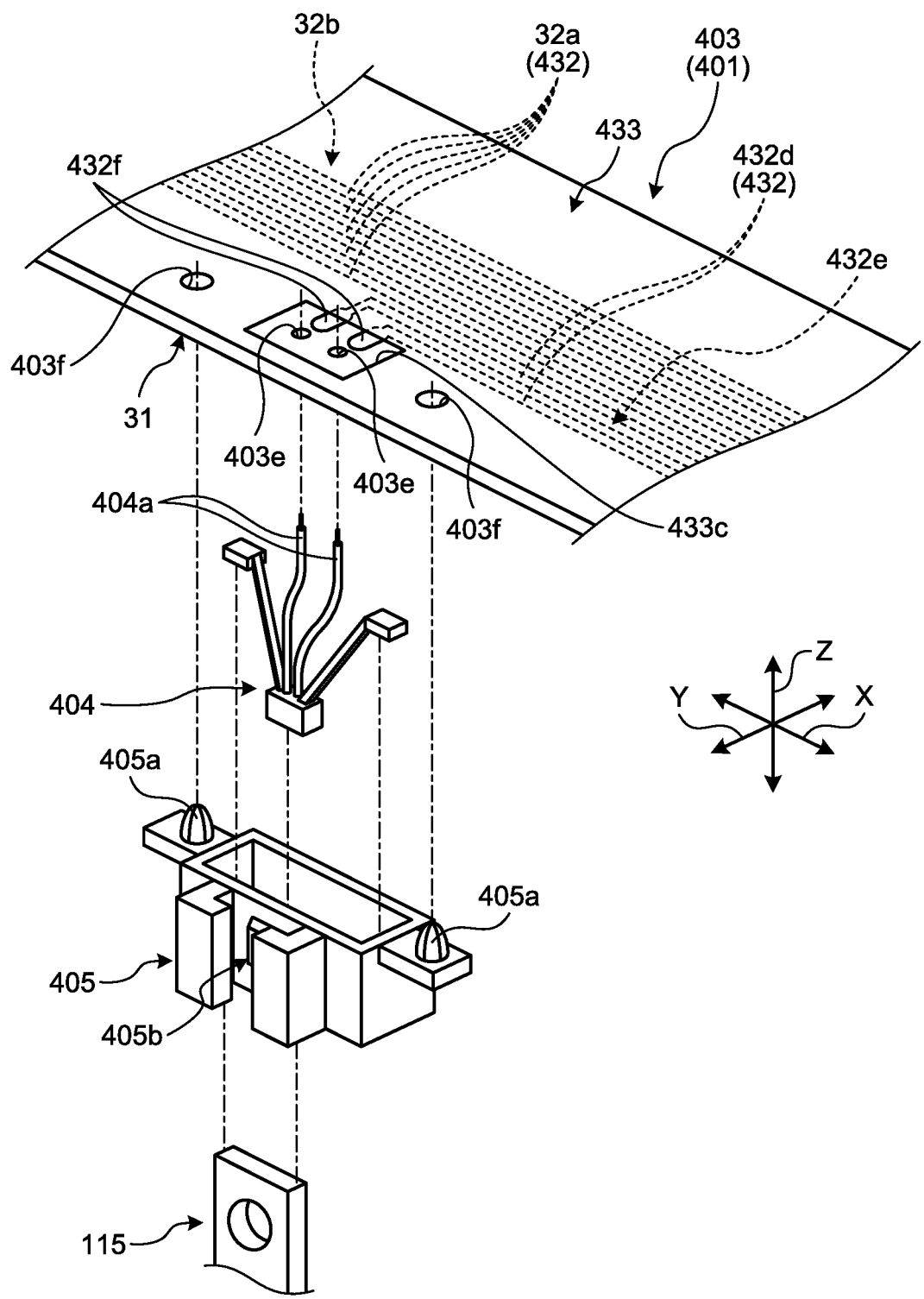
FIG. 8 is a partial exploded perspective view schematically illustrating a configuration of a conductive module according to a fourth embodiment.
Figure 9:
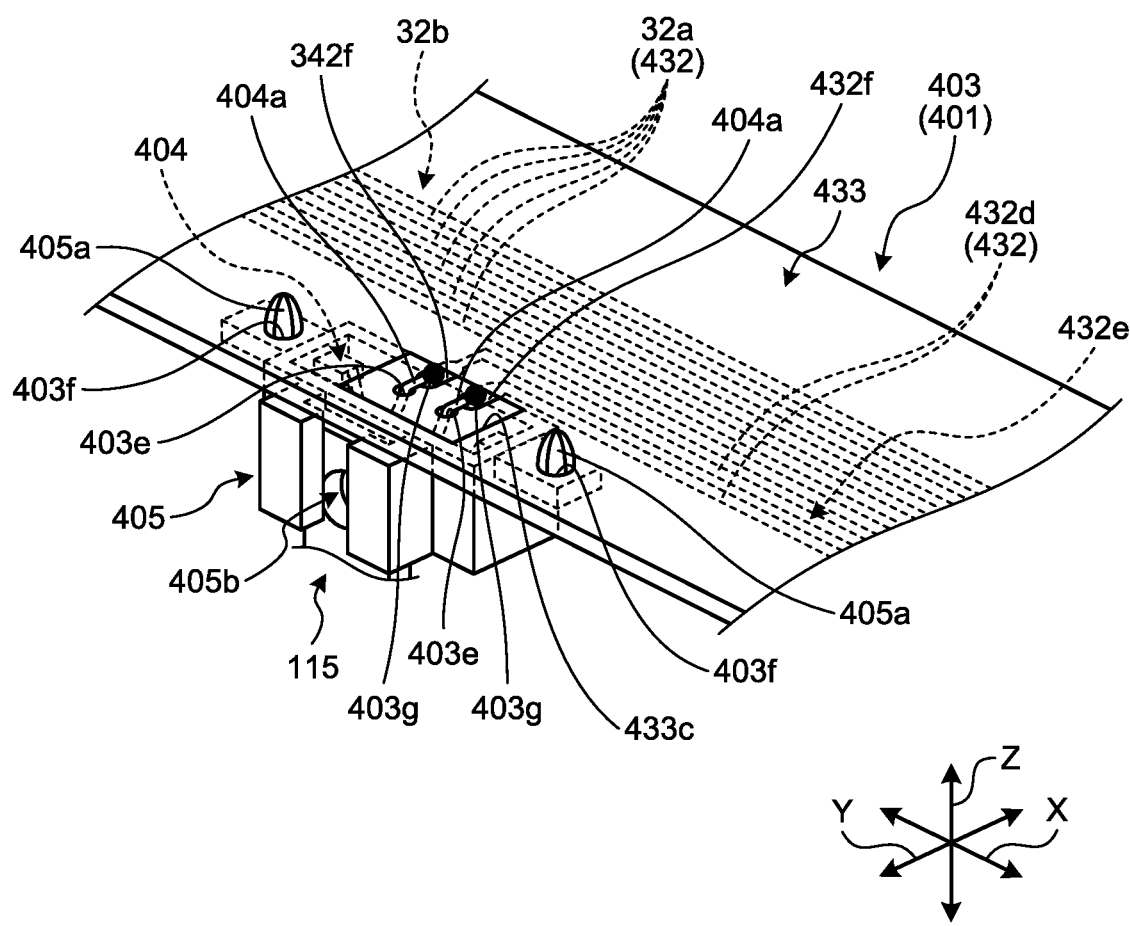
FIG. 9 is a partial perspective view schematically illustrating the configuration of the conductive module in the fourth embodiment.

The battery pack 100 in the fourth embodiment, as illustrated in FIGS. 8 and 9, is different from that of the above-described first embodiment in that a conductive module 401 is included in place of the conductive module 1, and other configurations are substantially the same as those of the first embodiment. The conductive module 401 is different from the above-described conductive module 1 in that a flexible substrate 403 is included in place of the flexible substrate 3, and other configurations are substantially the same as those of the conductive module 1.

The flexible substrate 403 of the fourth embodiment is different from the above-described flexible substrate 3 in that an electronic component 404 is mounted. The electronic component 404 is an element that is mounted on the flexible substrate 403 and executes various functions. Examples of the electronic component 404 include but not limited to an electronic control unit (ECU) including a fuse, a capacitor, a relay, a resistor, a transistor, a coil, an intelligent power switch (IPS), and an ECU microcomputer, and various sensor elements, light emitting diode (LED) elements, and the like. The electronic component 404 of the fourth embodiment will be described assuming that it is a thermistor that detects the temperature of the battery cells 111 (see FIG. 2 and others) and outputs a detection signal based on the detected temperature to the monitoring device 120 via the conductive module 401. The electronic component 404 is provided for each plurality of battery cells 111, for example.

The flexible substrate 403 of the fourth embodiment is different from the above-described flexible substrate 3 in that a conductive layer 432 is included in place of the conductive layer 32, and in that a reinforcing protective film 433 is included in place of the reinforcing protective film 33, and other configurations are substantially the same as those of the flexible substrate 3. In the flexible substrate 403 of the fourth embodiment, the surface on the flexible base film 31 side constitutes the mounting surface of the electronic component 404.

The conductive layer 432 of the fourth embodiment is different from the above-described conductive layer 32 in that, in addition to the first circuit pattern 32b configured by the first conductors 32a, a second circuit pattern 432e is configured by second conductors 432d, and other configurations are substantially the same as those of the conductive layer 32. The second conductors 432d are, as with the first conductors 32a, made of metal material having conductivity. The second conductors 432d are electrically coupled to the electronic component 404 mounted on the flexible substrate 403 and constitute the second circuit pattern 432e that electrically couples the electronic component 404 to the monitoring device 120. The second conductors 432d are, as with the first conductors 32a, made by a printing metal material such as copper foil on the flexible base film 31 and removing an unnecessary conductive portion from the second circuit pattern 432e by etching or the like. The second conductors 432d constitute the substantially L-shaped second circuit pattern 432e with portions extending in the width direction Y and portions extending in the array direction X, for example. In the second conductor 432d, an end portion of the portion extending in the width direction Y constitutes a second connection end portion 432f. The second connection end portion 432f is an end portion of the second conductor 432d to which the electronic component 404 is electrically coupled, that is, a connection end portion of the second conductor 432d coupled with the electronic component 404, and is an end portion exposed from the reinforcing protective film 433 as described later. The second conductor 432d is, as with the first conductor 32a, electrically coupled to the monitoring device 120 at an end portion of the portion extending in the array direction X. The second conductor 432d may be coupled to the monitoring device 120 directly, or may be coupled indirectly via a connector or the like. The second conductor 432d is provided for each terminal (for example, lead wire) 404a of the electronic component 404 to be mounted, that is, the number of second conductors 432d provided is the same as the number of terminals 404a (two, here). The second conductor 432d constitutes a temperature detection line to detect the temperature of a region where the temperature is detected via the electronic component 404 (temperature of the battery cells 111), for example.

The reinforcing protective film 433 of the fourth embodiment is different from the above-described reinforcing protective film 33 in that a second exposed portion 433c is included, and other configurations are substantially the same as those of the reinforcing protective film 33. The second exposed portion 433c is a portion that exposes at least a part of the second connection end portion 432f from the reinforcing protective film 433. The second exposed portion 433c is a portion not covering the conductive layer 432 with the reinforcing protective film 433 in the layer on which the reinforcing protective film 433 is provided. The second exposed portion 433c serves as a through hole that has a substantially rectangular shape, and exposes the second connection end portions 432f (two, here) to the inside.

The flexible substrate 403 of the fourth embodiment includes through holes 403e for mounting the electronic component 404. The through holes 403e penetrate through the flexible substrate 403 in the layer direction Z. That is, the through holes 403e penetrate through the flexible base film 31, the conductive layer 432, and the reinforcing protective film 433 in the layer direction Z. The number of through holes 403e provided is the same as the number of terminals 404a (two, here) of the electronic component 404 to be mounted. The through holes 403e are located at the second exposed portion 433c. The through holes 403e are near the respective second connection end portions 432f exposed to the second exposed portion 433c.

Furthermore, the flexible substrate 403 further includes retaining holes 403f for retaining a housing case 405 that accommodates the electronic component 404. The retaining holes 403f penetrate through the flexible substrate 403 in the layer direction Z. That is, the retaining holes 403f penetrate through the flexible base film 31, the conductive layer 432, and the reinforcing protective film 433 in the layer direction Z. The number of retaining holes 403f provided is the same as the number of retained portions 405a (two, here) of the housing case 405.

The electronic component 404 of the fourth embodiment is mounted from the flexible base film 31 side of the flexible substrate 403. In the electronic component 404, each terminal 404a is inserted to the respective through holes 403e of the flexible substrate 403 from the flexible base film 31 side. In the electronic component 404, each terminal 404a is then electrically coupled via solder 403g and the like to the second connection end portion 432f of the respective second conductors 432d exposed in the second exposed portion 433c.

The electronic component 404 is accommodated inside the housing case 405 and is mounted on the flexible substrate 403 together with the housing case 405. The housing case 405 is made of resin material or the like having insulating property into a substantially rectangular parallelepiped box, and accommodates the electronic component 404 inside. The housing case 405 includes the retained portions 405a and a bracket receiving portion 405b. The retained portions 405a are portions that are retained on the surface of the flexible base film 31 side of the flexible substrate 403, and a plurality of (two, here) retained portions 405a are provided at opposite locations in the array direction X. The retained portions 405a are configured by clamps, clips, and the like, and retain the housing case 405 on the surface of the flexible base film 31 side of the flexible substrate 403 by being inserted into and locked to the retaining holes 403f, for example. The bracket receiving portion 405b is a portion to which a bracket 115 extending from the battery cell 111 side of the battery module 110 is inserted. The conductive module 401 of the fourth embodiment is fitted to the battery cells 111 in such a positional relation that each of the electrode terminals 113 is inserted into the through-hole 21 of the respective connection terminals 2 and that the bracket 115 is inserted into the bracket receiving portion 405b of the housing case 405. With this configuration, the housing case 405 enables the conductive module 401 to properly position, fix, and protect the electronic component 404 to the proper location, that is, the location of detecting the temperature of the battery cells 111.

In the above-described conductive module 401 and the battery pack 100, because the conductive module 401 can be fitted to the battery cells 111 in a state of retaining the overall shape, the workability in assembling can be improved.

The above-described conductive module 401 and the battery pack 100 can, in the flexible substrate 403, electrically couple the electronic component 404 to the second connection end portions 432f of the second conductors 432d that are exposed via the second exposed portion 433c of the reinforcing protective film 433. As a result, the conductive module 401 and the battery pack 100 can properly mount the electronic component 404 on the flexible substrate 403.

The conductive module and the battery pack in the above-described embodiments are not limited to those of the embodiments, and various modifications can be made within the scope of the claims described in claims. The conductive module and the battery pack in the embodiments may be configured by combining the constituent elements of the foregoing respective embodiments and modifications as appropriate.

In the above description, the connection terminal 2 has been exemplified such that it constitutes the electrode-connection bus bar. However, the embodiments are not limited thereto. The connection terminal 2 may be electrically coupled to a single electrode terminal 113 or a single electrode-connection bus bar, and it may constitute a voltage detection terminal and the like for a single electrode terminal 113, for example.

The above-described conductive modules 1, 201, 301, and 401 only need to include at least one connection terminal 2 and at least one first conductor 32a.

In the above description, the electrode terminal 113 has been exemplified as the electrode pole having a substantially columnar shape. However, the embodiments are not limited thereto, and the electrode terminal 113 may be plate-like. In this case, the connection terminal 2 only needs to be electrically coupled to the electrode terminal having a plate-like shape by welding and the like.

In the above description, the first exposed portions 33a and the first connection end portions 32c have been exemplified as being provided in juxtaposition in the array direction X at the end of the width direction Y of the flexible substrate 3. However, the embodiments are not limited thereto.

In the above-description, it has been exemplified that, as one example, the first conductor 32a constitutes the voltage detection line and the second conductor 432d constitutes the temperature detection line. However, the embodiments are not limited thereto, and they may constitute a current detection line or the like.

The conductive module and the battery pack in each of the present embodiments can electrically couple the connection terminals that are electrically coupled to the electrode terminals of the battery cells to the monitoring device via the first conductors of the conductive layer of the flexible substrate. In this case, in the conductive module, the flexible substrate is made by stacking up the flexible base film, the conductive layer, and the reinforcing protective film. In the conductive module, the reinforcing protective film is made to include the first exposed portion and to have relatively higher rigidity than that of the flexible base film. With this configuration, the rigidity of the reinforcing protective film enables the conductive module to retain the shape as a whole even when the flexible substrate having the flexibility is used for the connection of the connection terminals and the monitoring device. In addition, the conductive module can electrically couple together the first conductor and the connection terminal at the first connection end portion exposed from the first exposed portion of the reinforcing protective film. As a result, because the conductive module can be fitted to the battery cells in a state of retaining the overall shape, the conductive module and the battery pack have an effect in that the workability in assembling can be improved.

Although the invention has been described with respect to the specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive module comprising:
 a connection terminal that is electrically coupled to at least one of two electrode terminals that each of a plurality of arrayed battery cells has; and
 a flexible substrate that includes a sheet-shaped flexible base film that has insulating property, a conductive layer that is stacked on the flexible base film and in that a first circuit pattern is configured by a first conductor that electrically couples the connection terminal to a monitoring device monitoring a state of the battery cell, and a sheet-shaped reinforcing protective film that has insulating property, is stacked on an opposite side of the flexible base film side of the conductive layer, and covers the conductive layer, wherein
 the reinforcing protective film includes a first exposed portion that exposes from the reinforcing protective film a first connection end portion that is a connection end portion to the connection terminal in the first conductor, and has relatively higher rigidity than rigidity of the flexible base film,
 the reinforcing protective film terminates at a side edge that extends along an array direction of the battery cells,
 the flexible base film includes a projecting end portion that faces the first connection end portion in a layer direction of the flexible base film, the conductive layer, and the reinforcing protective film, the first connection end portion and the projecting end portion protrude linearly from the side end to the connection terminal in a direction orthogonal to the layer direction and the array direction, and the flexible substrate includes, on both sides of the first connection end portion in the array direction of the battery cells, cutout portions that penetrate through the flexible base film, the conductive layer, and the reinforcing protective film in the layer direction and extend to one end of a direction intersecting with the layer direction and the array direction.

2. The conductive module according to claim 1, wherein the reinforcing protective film includes, in a direction intersecting with the layer direction of the flexible base film, the conductive layer, and the reinforcing protective film, a bent portion that is recessed to an opposite side of the reinforcing protective film side in the layer direction at a portion located between the first conductors constituting the first circuit pattern.

3. The conductive module according to claim 1, wherein the conductive layer includes a second circuit pattern configured by a second conductor electrically coupling an electronic component to be mounted on the flexible substrate to the monitoring device, and the reinforcing protective film includes a second exposed portion that exposes from the reinforcing protective film a second connection end portion that is a connection end portion to the electronic component in the second conductor.

4. The conductive module according to claim 1, wherein a plurality of the connection terminals are provided in the array direction of the battery cells, and the flexible substrate includes the first conductor provided for each of the connection terminals and includes a plurality of the first connection end portions and a plurality of the first exposed portions provided in the array direction at an end of a direction intersecting with the layer direction of the flexible base film, the conductive layer, and the reinforcing protective film, and with the array direction.

5. The conductive module according to claim 1, wherein the connection terminal includes a pair of fixing pieces that are spaced apart from each of other and fixed to the flexible substrate, and the first connection end portion is located between the fixing pieces.

6. The conductive module according to claim 1, wherein the flexible base film is coplanar with the connection terminal.

7. A conductive module comprising:

a connection terminal that is electrically coupled to at least one of two electrode terminals that each of a plurality of arrayed battery cells has; and a flexible substrate that includes a sheet-shaped flexible base film that has insulating property, a conductive layer that is stacked on the flexible base film and in that a first circuit pattern is configured by a first conductor that electrically couples the connection terminal to a monitoring device monitoring a state of the battery cell, and a sheet-shaped reinforcing protective film that has insulating property, is stacked on an opposite side of the flexible base film side of the conductive layer, and covers the conductive layer, wherein the reinforcing protective film includes a first exposed portion that exposes from the reinforcing protective film a first connection end portion that is a connection end portion to the connection terminal in the first conductor, and has relatively higher rigidity than rigidity of the flexible base film, and the reinforcing protective film includes, in a direction intersecting with a layer direction of the flexible base film, the conductive layer, and the reinforcing protective film, a bent portion that is recessed to an opposite side of the reinforcing protective film side in the layer direction at a portion located between the first conductors constituting the first circuit pattern.

8. The conductive module according to claim 7, wherein the conductive layer includes a second circuit pattern configured by a second conductor electrically coupling an electronic component to be mounted on the flexible substrate to the monitoring device, and the reinforcing protective film includes a second exposed portion that exposes from the reinforcing protective film a second connection end portion that is a connection end portion to the electronic component in the second conductor.

9. The conductive module according to claim 7, wherein a plurality of the connection terminals are provided in an array direction of the battery cells, and the flexible substrate includes the first conductor provided for each of the connection terminals and includes a plurality of the first connection end portions and a plurality of the first exposed portions provided in the array direction at an end of a direction intersecting with the layer direction of the flexible base film, the conductive layer, and the reinforcing protective film, and with the array direction.

10. A conductive module comprising:

a connection terminal that is electrically coupled to at least one of two electrode terminals that each of a plurality of arrayed battery cells has; and a flexible substrate that includes a sheet-shaped flexible base film that has insulating property, a conductive layer that is stacked on the flexible base film and in that a first circuit pattern is configured by a first conductor that electrically couples the connection terminal to a monitoring device monitoring a state of the battery cell, and a sheet-shaped reinforcing protective film that has insulating property, is stacked on an opposite side of the flexible base film side of the conductive layer, and covers the conductive layer, wherein the reinforcing protective film includes a first exposed portion that exposes from the reinforcing protective film a first connection end portion that is a connection end portion to the connection terminal in the first conductor, and has relatively higher rigidity than rigidity of the flexible base film, the reinforcing protective film terminates at a side edge that extends along an array direction of the battery cells, the flexible base film includes a projecting end portion that faces the first connection end portion in a layer direction of the flexible base film, the conductive layer, and the reinforcing protective film, the first connection end portion and the projecting end portion protrude linearly from the side end to the connection terminal in a direction orthogonal to the layer direction and the array direction, the connection terminal includes a pair of fixing pieces that are spaced apart from each of other and fixed to the flexible substrate, and the first connection end portion is located between the fixing pieces.

\* \* \* \* \*